Figure 1:
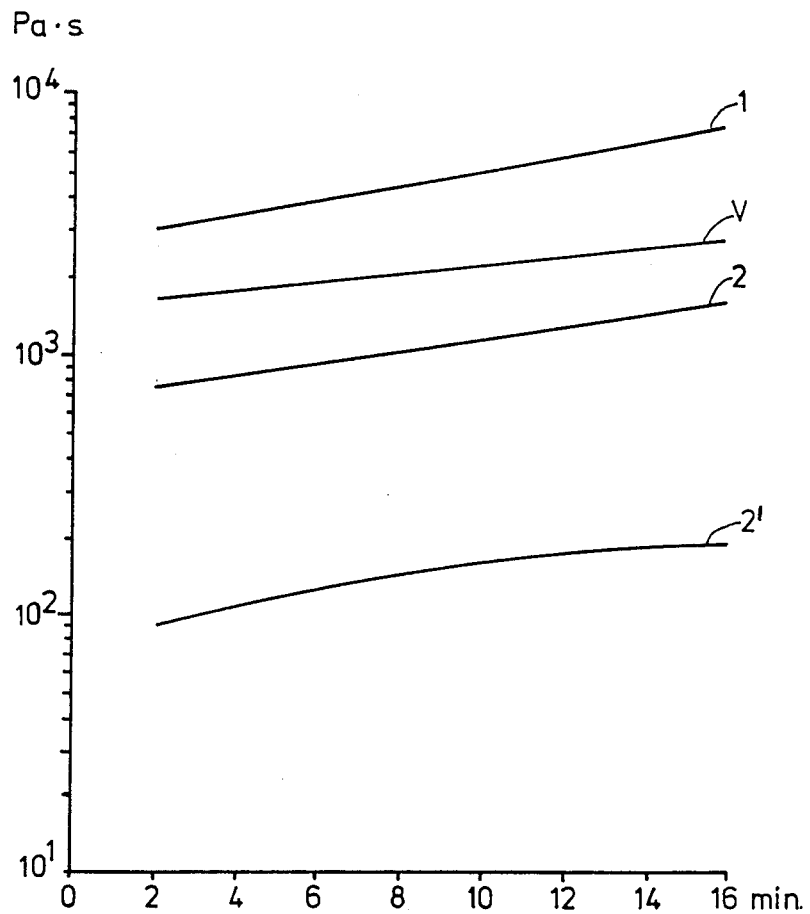

| United States Patent [19]
Meyer et al.

[11] Patent Number: 4,959,452
[45] Date of Patent: Sep. 25, 1990

[54] ALPHA-AMINO-EPSILON-CAPROLACTAM-MODIFIED POLYAMIDE PREPARATION

[75] Inventors: Rolf-Volker Meyer; Rolf Dhein, both of Krefeld; Martin Wandel, Dormagen; Harald Selbeck, Krefeld; Friedrich Fahnler, Krefeld; Hans-Detlef Heinz, Krefeld; Peter-Rolf Müller, Leverkusen, all of Fed. Rep. of Germany

[73] Assignee: Bayer Aktiengesellschaft, Leverkusen-Bayerwerk, Fed. Rep. of Germany

[21] Appl. No.: 182,336

[22] Filed: Apr. 18, 1988

[30] Foreign Application Priority Data

May 1, 1987 [DE] Fed. Rep. of Germany ....... 3714607
Mar. 2, 1988 [DE] Fed. Rep. of Germany ....... 3806632

[51] Int. Cl.$^5$ .............................................. C08G 69/14
[52] U.S. Cl. .................................... 528/328; 528/312; 528/323; 528/324; 528/329.1; 528/480; 528/481; 528/503

[58] Field of Search ............... 528/328, 323, 312, 324, 528/480, 481, 503, 329.1

[56] References Cited

U.S. PATENT DOCUMENTS 4,297,477 10/1981 Nakata et al. ....................... 528/323

Primary Examiner—Harold D. Anderson
Attorney, Agent, or Firm—Connolly and Hutz

[57] ABSTRACT

This invention relates to thermoplastically deformable branched aliphatic polyamides prepared by the hydrolytic polycondensation of lactams in the presence of small quantities of α-amino-ε-caprolactam (ACL) and approximately equivalent quantities of polycarboxylic acids (preferably dicarboxylic acids) and to a process for their preparation which is distinguished by considerably reduced polycondensation times without giving rise to cross-linked products. The process optionally in addition employs a solid phase after-condensation in which rapid further condensation takes place to the products with increased melt viscosity which are branched but are still soluble in m-cresol.

17 Claims, 1 Drawing Sheet

ALPHA-AMINO-EPSILON-CAPROLACTAM-MODIFIED POLYAMIDE PREPARATION

This invention relates to thermoplastically deformable branched aliphatic polyamides prepared by the hydrolytic polycondensation of lactams in the presence of small quantities of α-amino-ε-caprolactam (ACL) and approximately equivalent quantities of polycarboxylic acids (preferably dicarboxylic acids) and to a process for their preparation which is distinguished by considerably reduced polycondensation times without giving rise to cross-linked products. The process optionally in addition employs a solid phase after-condensation in which rapid further condensation takes place to form products with increased melt viscosity which although having a branched structure are still soluble in m-cresol.

Polyamides form a class of polymers which have been used for many years for numerous practical applications and which may be prepared by various processes and can be synthesized from a variety of widely differing polyamide forming starting materials; and for special applications they may be used alone or in combination with processing auxiliaries, polymeric alloying components or mineral reinforcing materials (e.g. fillers or glass fibres) to produce materials with specially adjusted combinations of properties. Thus polyamides are used in large quantities for the manufacture of fibres, plastics moulded parts and films but they have also been used in numerous technical applications, for example as hot melt adhesives and auxiliary agents.

Whereas lactams can be converted into polyamides by cationic, hydrolytic (with the addition of water) or anionic means, the preparation of polyamides from polyamide-forming monomers such as diamines dicarboxylic acids or suitable derivatives thereof and aminocarboxylic acids, even when used in combination with lactams, is virtually limited to the polycondensation reaction (see Vieweg, Müller; Kunststoff-Handbuch, Vol. VI, pages 11 et seq. Carl-Hanser Verlag, Munich, 1966).

"Hydrolytic polymerisation" is also of the greatest importance for the preparation of polyamides from lactams, e.g. of Polyamide 6 from ε-caprolactam.

Numerous procedures have become known for the preparation of polyamides. Depending on the nature of the end product required, these various methods use different monomer starting materials to determine the nature of the matrix and different chain terminating agents to adjust the average molecular weight to the required value or also monomers containing "reactive" groups for envisaged after-treatments (e.g. amino groups or sulphonate groups for improving the dye absorption of fibres with acid or basic dyes).

Both continuous and discontinuous production methods, e.g. in autoclaves, are known.

Common to all the methods of preparing (co) polyamides by polycondensation or by the hydrolytic polymerisation of lactams is that, starting from suitable monomer mixtures, the preparation of the (co)polyamides requires a reaction time of at least 6 hours, preferably from 6 to 12 hours, before the polyamides reach sufficiently high molecular weights to enable strands to be spun from the polymer melt or for whatever other purpose they are intended.

In addition to the long reaction time it is in many cases also necessary to carry out an after-condensation, e.g. in the solid phase, to enable even higher molecular weights to be obtained. Owing to the low reaction velocity, this inevitably entails relatively long after-condensation times at relatively high temperatures which often have a damaging effect (colour, oxidation).

The long reaction times required for the preparation of the (co)polyamides thus seriously limit the capacity of the production plants and in particular are highly energy consuming and cost intensive since the reaction must be carried out at temperatures above 200° C., in most cases above 250° C. but always above the melting point of the products to be produced.

A substantial reduction in the reaction times required for the preparation of (co)polyamides without loss of the well-known superior technical properties of the products for practical application would therefore constitute a great and in particular cost saving advance in the art.

It has now surprisingly been found that the polycondensation time required for the preparation of (co)polyamides from lactams can be drastically reduced by adding small quantities of α-amino-ε-caprolactam and approximately equivalent quantities of a polycarboxylic acid to the polyamide-forming starting monomers. Polyamides containing only small quantities of caprolactam monomers are thus obtained at lower polycondensation temperatures.

Apart from the actual process of preparing the polyamides, however, a further increase in the molecular weight is necessary for many applications which require products with even higher molecular weights, e.g. extrusion to form films or semi-finished products. This is difficult to carry out in the polycondensation apparatus conventionally employed such as autoclaves for discontinuous production or VK tubes or tube reactors for continuous production because the steep increase in fusion viscosity gives rise to various problems. Thus the control of temperature and removal of the water of reaction become progressively more difficult and the long reaction time required at the high temperatures leads to an increase in the amount of side reactions and the formation of gel particles whereby the quality of the end product cold be drastically impaired. Spinning also becomes more difficult at very high melt viscosities.

It is for this purpose that solid phase after-condensation provides decided advantages. By virtue of the much lower reaction temperatures (about 180° to 220° C., depending on the polyamide, compared with 250° to 280° C. for melt condensation), the risk of unwanted side reactions and gelling is reduced. Moreover, the fact that the material which is to be after-condensed consists of definite particles with interspace volumes helps to maintain a uniform reaction temperature and facilitates removal of the water of reaction when such after-condensation is combined with the variation of continuously keeping the granulate in motion, e.g. in tumbler driers. Moreover, since the material consists of particles, spinning problems do not arise.

Although solid phase after-condensation is widely used industrially for the preparation of relatively high molecular weight polyamides, this process also has numerous disadvantages which are due to the relatively low speed of after-condensation. Thus the usual after-condensation process still consumes a large amount of time and energy and owing to the considerable residence time at the given reaction temperature the process entails a considerable outlay in apparatus.

It would therefore be regarded as a great technological and in particular cost-saving advance in the art if solid phase after-condensation of polyamides could be considerably accelerated and/or carried out at lower temperatures without any impairment in the properties of the polyamide.

It has now surprisingly been found that polyamides modified with α-amino-ε-caprolactam (ACL) according to the invention can undergo unusually rapid after-condensation on their own in the solid phase to give rise to very high molecular weight products, even at lower reaction temperatures.

This effect is unexpected and was not foreseeable in spite of the fact that the melt polycondensation proper is accelerated by ACL since it is well known that melt polycondensation and solid phase after-condensation obey quite different laws and follow quite different mechanisms (see e.g. R. J. Gaymans, J. Amirtharaj, H. Kamp, J. Appl. Polym. Sci. 27, 2513–2526 (1984); L. B. Sokolov; Solid Phase Polymerisation, Syntheses by Polycondensation Publ. Israel Programm for Scientific Translation, 1968).

It has further been found that high molecular weight, probably branched (co)polyamides with considerably higher fusion viscosities than those of ACL-free (co)-polyamides are obtained from a solid phase after-condensation carried out for a considerably shorter time at relatively low temperatures.

The present invention therefore relates to a process for the preparation of (co)polyamides from one or more lactams, characterised in that from 0.02 to 2% by weight, preferably from 0.1 to 1.0% by weight, of α-amino-ε-caprolactam (hereinafter referred to as ACL) and approximately equimolar quantities of a (poly)carboxylic acid and optionally ω-aminocarboxylic acids are added to the polyamideforming mixture to be polymerised and in that these ACL-modified (co)polyamides are optionally after-condensed in the solid phase to give rise to (co)polyamides with increased fusion viscosity which have a branched structure but are still soluble in m-cresol.

The present invention also relates to the ACL-modified polyamides with altered structure (evidently branched structure and altered flow properties) thus obtained and to the moulded articles produced from them. No special increase in the dye absorption is observed but the polyamides have somewhat increased amino end group contents.

Many attempts have been described to obtain basic polyamides which can be more readily dyed with acid dyes, especially when used as fibres, by carrying out a cocondensation with polyamide-forming units which contain basic groups.

Thus DE-A No. 1 770 754, for example, discloses that improved dye absorption of polyamide fibres and greater colour intensity can be obtained with numerous different additives of this type. ACL is also mentioned there as one of several examples of additives to be used, but the polyamide described in the given example (VIII) does not differ characteristically from the others. There is absolutely no hint of any reaction shortening property of the specially selected ACL/dicarboxylic acid additives and the polycondensation time amounted to 16 hours. This is all the more understandable since a reaction shortening effect as described in the present invention is not found in any of the other additives mentioned (see also comparison experiment in the part of the application dealing with examples).

In EP-A No. 0 013 553 it is stated that a polymer of ACL was not hitherto known and it is moreover assumed in the said document that cross-linking would inevitably take place owing to the possibilities of reaction of the amino group. EP No. 0 013 553 therefore describes polyamides with improved dye absorption obtained from N,N-dialkyl substituted α-amino-ε-caprolactams which are distinguished by special solubility properties. These dialkyl substituted ACL compounds used in small quantities, however, show no positive influence on the polymerisation of lactams.

It has been found that when ACL is used as the only additive in the polymerisation of lactams, it acts as molecular weight reducing chain regulating agent and even prevents the synthesis of high molecular weight polyamides when used at concentration of about >1%.

It was therefore completely unforeseeable and surprising to find that when the combination of ACL and polycarboxylic acids (preferably dicarboxylic acids) claimed for this invention is added to the monomer starting mixture at the beginning of the reaction, it results in a drastic acceleration of polyamide formation and still enables high molecular weights to be obtained in the resulting polyamide.

The lactams used in the context of the present invention may be lactams having from 5 to 13 ring members, e.g. pyrrolidone, ε-caprolactam, oenantholactam, caprylic lactam and lauric lactam, used alone or as mixtures, ε-caprolactam and lauric lactam being preferred. ε-Caprolactam is particularly preferred.

α-Amino-ε-caprolactam (ACL) is a known substance and may be prepared by known processes (for preparation see CAS No. 671/42/1).

The polycarboxylic acids used for the combination with ACL are preferably aliphatic dicarboxylic acids with 6 to 12 carbon atoms or aromatic dicarboxylic acids with 8 to 18 carbon atoms, e.g. adipic acid, trimethyladipic acid, suberic acid, azelaic acid, sebacic acid, dodecane diacid, isophthalic acid or terephthalic acid. Adipic acid, azelaic acid and isophthalic acid are particularly preferred. Monocarboxylic acids such as acetic or benzoic acid may also be used in quantities of up to 20 equivalents percent of the carboxylic acid groups.

The aromatic dicarboxylic acids are used in minor quantities (at the most about 40 mol-% of the dicarboxylic acids).

Since it is found, completely unexpectedly that the effect of ACL of shortening the reaction time is only produced in the presence of polycarboxylic acids, it may be assumed that protonated ACL is the active species.

To accelerate lactam polymerisation, from 0.1 to 2% by weight, preferably from 0.2 to 1% by weight, most preferably from 0.3 to 0.7% by weight of ACL and approximately the equivalent quantity of dicarboxylic acid should be used according to the invention. The ACL and dicarboxylic acid components may be added separately or together, optionally in aqueous solution, but they are always preferably added before or at the beginning of the reaction. Although equivalent quantities of carboxylic acid groups are preferred (equivalence based on the α-amino group in ACL), about 0.75 to 1.10 equivalents, preferably 0.85 to 1.03 equivalents, especially 0.90 to 1.00 equivalents of carboxylic acid groups may be used.

The polycondensation time, e.g. at 270° C., may then be reduced from about 6–10 hours to 0.5–3 hours. Polycondensation times of from 1 to 3 hours at polycondensation temperatures of 240° to 285° C. are preferred. The longer polycondensation times are preferably used as the lower temperatures and the shorter times preferably at the higher temperatures. The polycondensation reaction may be carried out discontinuously or by a continuous process, e.g. in tube reactors or single shaft or double shaft extruders, optionally followed by after-condensation vessels or reactors.

According to the invention, the polycondensation time required (depending on the given polycondensation temperature) for producing polyamides of the required melt viscosity may be reduced to less than half the usual polycondensation times required for (co)-polyamides free from ACL.

Acceleration of the reaction may also be employed to synthesize polyamides at a lower temperature. In the case of the preparation of Polyamide-6 from ε-caprolactam, for example, this leads to higher polyamide yields and it may result in lower monomer contents, depending on the temperature. Compared with known products, the polyamides obtained have characteristically higher melt viscosities at comparable solution viscosities ($\eta_{rel}$, 1% in m-cresol at 25° C.) and they show a marked structural viscosity and presumably have a different (branched?) structure.

The polyamides prepared according to the invention may be discharged from the melt, preferably into a water bath and chopped up, extracted and dried a known manner.

Moulded articles, fibres and films may also be obtained from the polyamides by thermoplastic processing in a known manner.

The resulting ACL-modified (co)polyamides may optionally be after-condensed in the solids phase at temperatures below their melting point for the purpose of increasing the molecular weight at relatively low reaction temperatures. This is generally accompanied by a marked increase in the fusion viscosity.

Any ACL-modified (co)polyamides prepared by melt polycondensation may be used for the preparation of these high molecular weight, branched polyamides by solid phase condensation, which is also claimed here. Particularly suitable, for example, are those based on Polyamide 6, 11 or 12.

The reaction time required in the solid phase for reaching the required fusion viscosity is drastically reduced compared with that required for ACL-modified polyamides and the after-condensation may also be carried out at markedly lower temperatures.

Suitable reaction temperatures for the after-condensation are in the range of from 140° to 240° C., preferably from 150° to 210° C., more preferably 150° to 200° C. The reaction should in all cases be carried out at a temperature at least 10 deg. Centigrade, preferably at least 20 deg. Centigrade, below the melting point of the particular polyamide.

The condensation time may be chosen from a few minutes to about 30 hours, preferably from 0.5 to 20 hours, in particular from 1 to 15 hours. The longer reaction times should be used in particular for the lower after-condensation temperatures and the shorter reaction times preferably for the higher after-condensation temperatures.

All apparatus conventionally employed for a solid phase after-condensation are suitable for the preparation of the polyamides according to the invention. For a discontinuous process it is preferred to use tumbler driers and helical mixers. Continuous solid after-condensation processes are also suitable for the preparation of the polyamides according to the invention.

The high molecular weight branched polyamides have characteristically higher melt viscosity values than known comparable products with similar solution viscosities ($\eta_{rel}$, 1% in m-cresol at 25° C.). and they have a marked structural viscosity.

The high molecular weight, branched polyamides are suitable for all applications for which high molecular weight polyamides are employed, but especially for extrusion to form films or semi-finished products or for the production of fibres and bristles or as a basis for the production of polyamide mixtures with known impact modifiers to give rise to products with exceptionally high impact strength and resistance at low temperatures.

The following Examples serve to illustrate the invention without in any way limiting it.

The melt viscosity values were determined by means of a Contraves RM 300 plate-cone viscosimeter at the given temperatures.

Example 1

9.8 kg of ε-Caprolactam, 200 g of a 50% aqueous solution of α-amino-ε-caprolactam (ACL) (corresponds to 1% by weight, based on the quantity of c-caprolactam), 50 g of azelaic acid and 1 l of distilled water are weighed into a 25 l pressure autoclave. A nitrogen atmosphere is obtained in the autoclave by forcing nitrogen into it three times under a pressure of 3 bar and then releasing the pressure. The autoclave contents are rapidly heated to 200° C. (in about 1 hour) and stirred at their own pressure for one hour at 200° C. The pressure is then released to normal pressure in about 1 hour, the temperature is rapidly raised to 270° C. and polycondensation is then carried out for 1 hour at 270° C. while nitrogen is passed over at the rate of 40 l N$_2$/h.

The reaction mixture is left to settle and the polyamide is then forced as a strand under excess pressure through the bottom valve into a water bath.

After granulation and extraction with distilled water, 8.74 kg of Polyamide-6 having a relative viscosity (1% in m-cresol at 25° C.) of 3.5 are obtained. The product has a very high melt viscosity (see FIG. 1).

Example 2

A polyamide is prepared as in Example 1 from 10.0 kg of ε-caprolactam, 100 g (390 mmol) of α-amino-ε-caprolactam (as 50% aqueous solution) and 35 g (186 mmol) of azelaic acid. The polyamide has a relative viscosity of 3.1. The melt viscosity approximately corresponds to that of known Polyamide-6 products which have a relative viscosity of 3.8.

Comparison Experiment 1

A polyamide is prepared by a method analogous to that of Example 1 but without the addition of α-amino-ε-caprolactam and azelaic acid. The polyamide obtained has a relative viscosity of 2.1 and can hardly be spun owing to its very low melt viscosity.

Comparison Experiment 2

A polyamide is prepared by a method analogous to that of Comparison Experiment 1, but polycondensation is carried out for 6 hours at 270° C. The polyamide obtained has a relative viscosity of $\eta_{rel}$ 3.0 and its melt viscosity is considerably lower than that of the product of Example 2.

Comparison Experiment 3

Example 1 is repeated but with the difference that the ACL and azelaic acid are added at 200° C. only after the release of pressure. The product obtained after a polycondensation time of 1 hour has a relative viscosity of 2.2. After 6 hours, the relative viscosity is 3.0. It is therefore more advantageous to add the aminocarboxylic acid and dicarboxylic acid at the beginning of the polyamide forming reactions.

Example 3

90 g of ε-caprolactam, 10.4 g of 6-aminohexanoic acid, 1 g of ACL and 0.70 g of azelaic acid are weighed into a 250 ml round bottomed flask. After the flask has been evacuated twice and pressure released with nitrogen, the contents are heated to 200° C. in 15 minutes with stirring and kept at 200° C. for 1 hour. The contents are then heated to 270° C. for 10 minutes and polycondensed for 2 hours. The granulate is extracted with distilled water. The polyamide has a relative viscosity of 4.2.

Comparison Experiment 4

Example 3 is repeated but without the addition of azelaic acid. The melt is still highly fluid after 2 hours at 270° C. After a condensation time of 6 hours, a product with a relative viscosity of $\eta_{rel}=3.2$ is obtained.

Comparison Experiment 5

The polyamide obtained after 6 hours under the conditions of Comparison Experiment 4 without ACL and without azelaic acid has an $\eta_{rel}$ value of 3.9.

The comparison experiments given show that ACL alone acts as chain terminating agent in the polyamide synthesis.

Example 4

Example 3 is repeated at a polycondensation temperature of 240° C. (instead of 270° C.) and 0.80 g of ACL is added together with 0.40 g of adipic acid. A polyamide with a high melt viscosity and a relative viscosity of 2.9 is obtained after 3 hours at 240° C.

Comparison

Only a very low viscosity polyamide melt with an $\eta_{rel}$ value of 1.5 is obtained under the same conditions without the additives.

Example 5

7.0 kg of lauric lactam, 100 g of a 50% aqueous ACL solution, 28 g of adipic acid and 1.5 l of distilled water are introduced into the autoclave analogously to Example 1. The autoclave contents are heated to 210° C. (20 bar) with stirring and the pressure is released. This is followed by heating to 240° C. (14 bar) and release of pressure followed by heating to 270° C. (2 bar). The autoclave contents are then heated to 270° C. under their own pressure for 2 hours with stirring. The pressure is then released over a period of 15 minutes and the polyamide is immediately discharged as a strand at 270° C. without further polycondensation. The extracted polyamide (6.7% lauric lactam extract with methanol) has a relative viscosity of 3.5. The viscosity of the melt in dependence upon the shear stress (measured at 280° C.) is as follows:

300 Pa/4000 Pa.s;
1000 Pa/3600 Pa.s;
5000 Pa/1900 Pa.s.

Comparison Experiment 6

Example 5 is repeated without ACL/adipic acid. A polyamide having a relative viscosity of 2.8 (after extraction with methanol: 6.5% lauric lactam) is obtained. The comparison values for the melt viscosity at 280° C. are as follows:

300 Pa/130 Pa.s;
1000 Pa/125 Pa.s;
5000 Pa/110 Pa.s.

After a further 4 hours of polycondensation at 270° C., a polyamide having a relative viscosity of 3.7 is obtained but its melt viscosity is still lower than that of the product of Example 5:

300 Pa/2000 Pa.s;
1000 Pa/1900 Pa.s.

FIG. 1 represents the viscosity in dependence upon the measuring time. Curve 1 represents the measurements obtained in Example 1, curve 2 those of Example 2 and curve 2' those of Comparison Experiment 2. Curve V corresponds to the values measured on commercial Polyamide-6 having a relative viscosity of 3.9 (Durethan ® B 40 F of BAYER AG/D 5090 Leverkusen).

Example 6

92.5 g of caprolactam, 9.4 g of 6-aminocaproic acid, 1.02 g of 50% aqueous ACL solution and 0.38 g of azelaic acid were weighed into a 250 ml round bottomed flask. After the flask had been rendered inert with nitrogen, precondensation was carried out for one hour at 200° C. and the contents were then heated to 270° C. within about 15 minutes and the reaction was left to proceed for the required length of time at this temperature. The heating bath was then removed, the flask was taken down and the polymer was chopped up when cold and extracted with water for 24 hours.

Table 1 shows the solution viscosities and melt viscosities of two batches which had been reacted for different lengths of time. The figures for reaction mixtures which had not been ACL modified are given for comparison (batches 1 and 3).

TABLE 1

(Example: 6/2 and 6/4; 6.1 and 6.3 are comparisons)

| Batch | ACL | t at 270° C. (h) | $\eta_{rel}$ | Melt viscosity (270° C. 10 s$^{-1}$) |
|---|---|---|---|---|
| 6.1 | no. (Comparison) | 1 | 2.3 | 60 |
| 6.2 | yes | 1 | 2.5 | 120 |
| 6.3 | no (Comparison) | 3 | 3.1 | 195 |
| 6.4 | yes | 3 | 3.4 | 850 |

Examples 7 to 14

Portions of ACL modified PA-6 granulate weighing about 100 g were after-condensed in a rotary evaporator in a stream of nitrogen for various lengths of time. The conditions were: 50 revs/min, 170° C., 40 l N$_2$ h$^{-1}$.

Table 2 shows the $\eta_{rel}$ values and the fusion viscosities at a temperature of 250° C.

Comparison Example 7

A straight chained, typical PA-6 ($\eta_{rel}=3.7$) having a melt viscosity approximately the same as that of the granulate used in Examples 7 to 14 was after-condensed for 7 hours as described above. Only a very slight increase in molecular weight occurred ($\eta_{rel}=3.9$).

The melt viscosity was also virtually unchanged after the after-condensation.

Comparison Example 8

A straight chained product conventionally used in technical processes, based on PA-6 ($\eta_{rel}=2.9$), having a relative solution viscosity approximately the same as that of the granulate used in Examples 7 to 14 but a much lower melt viscosity (about 190 Pa.s at 250° C. and about 1 s$^{-1}$) was after-condensed for 7 hours in the manner described above. Only a relatively slight increase in molecular weight occurred ($\eta_{rel}=3.2$).

The melt viscosity of the after-condensed polyamide was about 480 Pa.s.

TABLE 2

| Example | t at 170° C. (h) | $\eta_{rel}$ | Melt viscosity (Pa · s)* |
|---|---|---|---|
| 7 | 0 | 3.0 | 500 |
| 8 | 1 | 3.2 | n.d. |
| 9 | 2 | 3.2 | n.d. |
| 10 | 3 | 3.3 | 1400 |
| 11 | 4 | 3.5 | n.d. |
| 12 | 5 | 3.7 | n.d. |
| 13 | 6 | 3.7 | n.d. |
| 14 | 7 | 3.6 | 3000 |

*The melt viscosity is determined at 250° C. and a shear gradient of about 1 s$^{-1}$.
n.d. = not determined.

The Examples demonstrate that ACL-modified polyamide can be rapidly after-condensed to very high molecular weight products (6 times the melt viscosity) whereas straight chained products which have comparable solution and melt viscosities but have not been modified with ACL undergo only a very slight increase in molecular weight.

We claim:

1. A process for the preparation of predominantly aliphatic polyamide by the hydrolytic polymerization of at least one polyamide-forming lactam, wherein from 0.1 to 2% by weight of -amino-ε-caprolactam and a quantity of (poly)carboxylic acid, equivalent thereto are added to the lactam to be polymerized and to form a polyamide with increased viscosity and melt viscosity which has a branched structure but is still soluble in m-cresol.

2. A process according to claim 1 wherein the amount of α-amino-ε-caprolactam is 0.2 to 1% by weight.

3. A process according to claim 1 wherein from 0.3 to 0.7% by weight of α-amino-ε-caprolactam is added to the lactam to be polymerized.

4. A process according to claim 1 wherein the (poly)-carboxylic acid is a dicarboxylic acid.

5. A process according to claim 4 wherein α-amino-ε-caprolactam and an approximately equivalent quantity of dicarboxylic acid are added before or at the beginning of the reaction.

6. A process according to claim 1 wherein from 0.75 to 1.10 equivalents of carboxylic acid group are added per equivalent of the α-amino-group of the α-amino-ε-caprolactam.

7. A process according to claim 6 wherein the amount of carboxylic acid group is from 0.85 to 1.03 equivalents per equivalent of α-amino group.

8. A process according to claim 6 wherein the amount of carboxylic acid group is from 0.90 to 1.0 equivalents per equivalent of α-amino group.

9. A process according to claim 6 wherein at least one monocarboxylic acid replaces the polycarboxylic acid in an amount of up to 20 equivalent percent of carboxylic acid groups.

10. A process according to claim 9 wherein the monocarboxylic acid is acetic acid or benzoic acid.

11. A process according to claim 1 wherein the hydrolytic polymerization is carried out within a reduced polymerization time amounting to less than half the time required without α-amino-ε-caprolactam and (poly)-carboxylic additives.

12. A process as claimed in claim 11 wherein the polymerization time is 0.5 to 3 hours at a temperature from 240° to 285° C.

13. A process for the preparation of predominantly aliphatic polyamide by the hydrolytic polymerization of at least one polyamide-forming lactam, wherein from 0.1 to 2% by weight of α-amino-ε-caprolactam and a quantity of (poly)carboxylic acid, equivalent thereto are added to the lactam to be polymerized and said polyamide is after condensed in the solid phase to form a polyamide with increased viscosity and melt viscosity which has a branched structure but is still soluble in m-cresol.

14. A process according to claim 13 wherein the solid phase after-condensation is carried out continuously or discontinuously at a temperature from 140° to 240° C. but always at a temperature at least 10 Centigrade degrees below the melting point of the polyamide and at a time from a few minutes to about 30 hours.

15. A process as claimed in claim 14 wherein the after-condensation temperature is from 150° to 200° C.

16. A process as claimed in claim 14 wherein the after-condensation temperature is at least 20 Centigrade degrees below the polyamide melting point.

17. A process as claimed in claim 14 wherein the after-condensation is at a time from 0.5 to 20 hours.

* * * * *